United States Patent Office 2,883,829
Patented Apr. 28, 1959

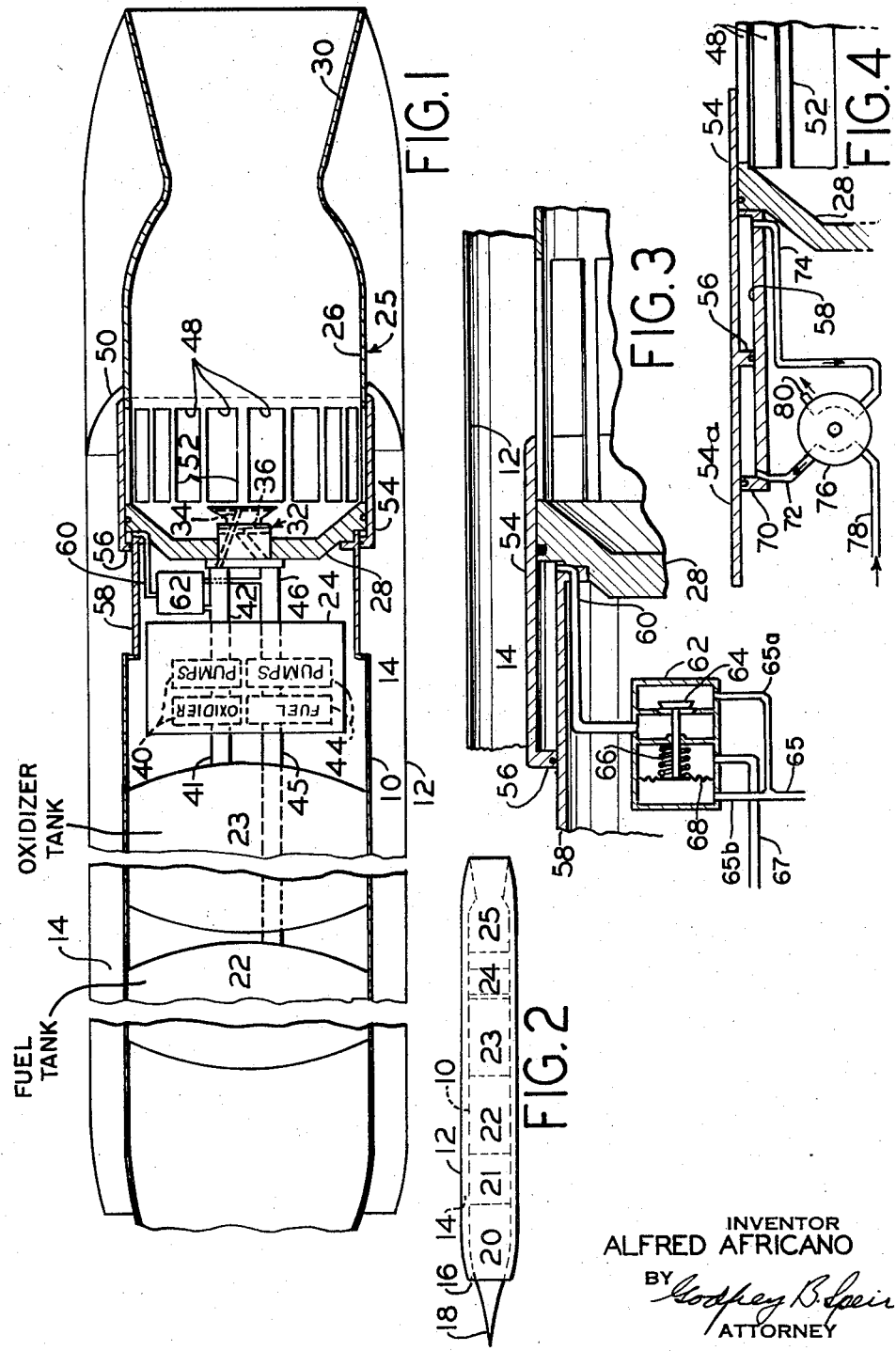

2,883,829

ROCKET ENGINE CONVERTIBLE TO A RAMJET ENGINE

Alfred Africano, Caldwell, N.J., assignor to Curtiss-Wright Corporation, a corporation of Delaware Application January 24, 1955, Serial No. 483,624

2 Claims. (Cl. 60—35.6)

This invention relates to jet reaction motors or engines, and is concerned with a motor for aircraft which may be operated either as a rocket or as a ramjet.

Both of these motor types, individually, have been extensively developed. As is well known, the rocket motor uses fuel burned with a vehicle-carried oxidizer to develop jet thrust and for any particular motor size, is capable of developing a large amount of thrust at any vehicle speed from nil on up. The ramjet burns fuel in air from the atmosphere, and depends on substantial vehicle velocity to compress the air, by ram action, so that the burning fuel-air mixture will produce effective thrust for vehicle propulsion. There have been various proposals of ramjet powered vehicles which are accelerated by rocket motors to a speed where ramjet operation becomes effective for sustained propulsion.

According to the present invention, the same motor or combustion chamber is used for both rocket and ramjet operation. The same fuel and fuel injection apparatus are used for both modes of operation. Oxidizer supply and injection apparatus is provided, and is used during operation of the motor as a rocket.

Ram air ducts, and air entrance openings to the motor, are provided to enable motor operation as a ramjet. During rocket operation, the motor air entrance openings are closed by suitable valve means.

When the invention is used for propelling a missile, rocket propulsion would be used at a high thrust value for a short interval to accelerate the missile to a desired altitude and speed. When the rocket oxidizer is substantially spent, oxidizer flow is reduced, the ram air valve means is actuated and the motor continues operation as a ramjet to provide sustaining thrust for missile flight. Rocket thrust for acceleration would be of the order of 5 to 10 times the thrust required for sustained flight.

A practicable vehicle utilizing the provisions of my invention can be designed for a considerable variety of performance characteristics. Generally, it is adaptable to medium and long range ground-to-ground missiles, operating at altitudes of 40,000 to 60,000 feet and at speeds of Mach 1 to 3. The invention can also be used for piloted aircraft.

Features and details of the invention may be better understood by reading the following detailed description in connection with the drawings, which show an exemplary but non-limiting embodiment.

In these drawings, wherein similar reference characters show similar parts,

Fig. 1 is a longitudinal sectional elevation of an aircraft embodying the invention, Fig. 2 is an overall side elevation of the aircraft.

Fig. 3 is an enlarged longitudinal elevation of a portion of the motor of the invention, showing one type of control arrangement, and Fig. 4 is a view similar to part of Fig. 3 showing an alternative control arrangement.

Figs. 1 and 2 show generally a ramjet-rocket missile powerplant comprising a central body 10 embraced by a duct body 12, the two bodies being spaced and defining therebetween an annular ram-air duct and diffuser 14. When in flight, ram air enters the duct 14 at a forward opening 16 between the two bodies, and the central body 10 carries a forward element 18 serving as a shock diffuser.

The central body 10 contains the disposable load, which may comprise a payload 20, controls 21, fuel tankage 22, oxidizer tankage 23, and pumping equipment 24. At the rearward end of the central body, a motor unit 25 is disposed. This comprises a combustion chamber 26 of substantially cylindrical form, having a forward head 28 and a rearward jet nozzle 30.

The chamber head 28 is equipped with one or more injector units 32 having passages 34 for fuel and 36 for oxidizer, both of which, when in operation, deliver their liquids into the chamber 26 for intermixture and combustion. The hot combustion products pass through the nozzle 30 to the atmosphere, the reaction to this gas flow producing propulsive thrust on the vehicle.

A suitable ignition system, not shown, is provided.

The unit 24 shows, schematically, a turbine pump 40 for oxidizer and pipes 41 and 42 for feeding oxidizer from the tank 23 to the injector unit 32. In similar fashion, a turbine-pump 44 for fuel and pipes 45 and 46 serve to fed fuel from its tank 22 to the injector unit 32.

The motor unit, near the head end of the cylindrical chamber 26, is provided with one or more openings 48, whose aggregate area is quite large, to enable flow of rammed air from the duct 14 into the chamber. When the motor operates as a ramjet, air passing into the chamber mixes with fuel from the fuel passages 34, burns, and provides hot gas for ejection through the nozzle 30. A fairing 50 is provided in the duct 14 to guide air smoothly and with minimum turbulence from the duct to the chamber. The openings 48 may be of any desired shape to allow smooth and copious flow of air into the chamber but should have enough structure between them to maintain the structural integrity of the motor, particularly under the high temperatures to which the motor is subject during operation as a rocket motor.

Ramjet operation is also at high temperature, but the ram air flowing into the chamber will keep the elements such as 52, which separate the openings 48, well cooled.

A sleeve valve 54 is arranged around the chamber 26, and is axially slidable to cover and uncover the openings 48. When the motor operates as a rocket, the valve 54 closes the openings, and both fuel and oxidizer are fed from the injector 32.

When the motor operates as a ramjet, the valve 54 opens to admit ram air, and the feed of oxidizer is cut off by appropriate controls, not shown, or by depletion of the oxidizer supply. Alternatively, a small flow of oxidizer may continue to provide hot ignition gas, to assure combustion of air and fuel particularly at high altitude.

Fig. 3 shows a scheme for controlling valve 54 automatically. The forward end of the valve is formed with an annular piston 56 which engages a cylinder 58 forming part of the body 10. With the valve 54 closed, in a rearward position, as in Fig. 1, pressure fluid is admitted through a conduit 60 to the rear end of the cylinder 58, whereupon the fluid acts on the piston 56 and moves the sleeve valve 54 forwardly to an open position. Operating fluid may be pressurized fuel drawn from the pipe 46, through a valve unit 62.

The valve unit 62 serves to open slide valve 54 automatically in response to exhaustion of oxidizer, to bring the engine into ramjet operation with no interruption of thrust production. Unit 62 comprises a poppet 64 which when open passes fuel from pipe 46 through inlets 65 and 65a to conduit 60. The poppet is normally held closed by a spring 66, and is secured to a diaphragm 68 exposed on its left side as shown to fuel pressure by way of inlets 65b and 65 and on its right side as shown to oxidizer pressure by way of inlet 67. So long as these two fluid pressures are approximately the same, the spring 66 holds poppet 64 closed. When oxidizer is exhausted, pressure drops on the right side of diaphragm 68 and fuel pressure overcomes spring 66 and opens poppet 64, enabling pressurized fuel to pass to cylinder 58 and open valve 54.

Fig. 4 shows another arrangement for operating slide valve 54. Herein, the valve 54 extends forwardly as at 54a, to overlie an annular head 70 on the cylinder 58. Annular piston 56 is movable from the head 70 toward the motor head 28 to close slide valve 54, as well as being movable in the opposite direction to open slide valve 54. Conduits 72 and 74 lead from the front and rear ends respectively of the cylinder 58 to a two-way valve 76. This valve is furnished with pressure fluid from a line 78, and is vented at 80. By manipulation of valve 76, the slide valve 54 may be moved forwardly or rearwardly, to uncover or cover chamber openings 48.

In operation of the jet reaction engine, the rate of fuel and oxidizer feed to the chamber, when operating as a rocket, is high to attain large values of thrust. But when operating as a ramjet engine, since such large thrust is not required, the amount of fuel feed may be reduced materially.

In general, for use in this invention, the fuel and oxidizer are considered as being liquids. I have mentioned turbine pumps for feeding the liquids, but other feed systems may be used. For instance, pressurized tanks provide an alternative system, or a combination of a pumping system and pressurized tanks could be utilized. When the rocket fuel is exhausted after its use for initial acceleration, the chamber air ports are opened and the engine continues operation as a ramjet. Liquid fuel for ramjet operation may be fed either to the combustion chamber or into the air duct, the fuel-air mixture being ignited in the combustion chamber.

A particular advantage flowing from the use of my invention, in addition to those already set forth, is that the same combustion chamber, which is constructed to stand very high temperatures serves for both rocket and ramjet combustion. In a system involving two separate combustion units, the high temperature resistant components have to be duplicated.

While I have described my invention in detail in its presently preferred embodiment, it will be clear to those skilled in the art that various changes and modifications may be made therein without departing from the spirit or scope thereof. I aim, in the appended claims, to cover such modifications and changes.

I claim:

1. A rocket-ramjet engine comprising a combustion chamber having a cylindrical body, said chamber having a discharge nozzle at its rearward end and a head at its forward end, said body at its forward end having a plurality of air entrance openings, pressurized liquid fuel injection means in said head, pressurized liquid oxidizer injection means in said head, a cylindrical slide valve embracing said body movable relative thereto to cover and uncover said air entrance openings for rocket or ramjet operation respectively of said engine, motor means to move said slide valve including means responsive to a substantial balance of fuel and oxidizer pressure to hold said motor means in a position corresponding to a valve position in which the air entrance openings are closed and responsive to fuel pressure and to a drop in oxidizer pressure due to a depletion of liquid oxidizer to operate said motor means to move said slide valve to a position on the body whereat said openings are uncovered for air entry to said chamber.

2. A rocket-ramjet engine according to claim 1 wherein said motor means comprises a hydraulic motor, and wherein said responsive means comprises a valve sensitive to oxidizer pressure drop to open said motor means to pressurized hydraulic fluid.

References Cited in the file of this patent

UNITED STATES PATENTS

| | | |
|---|---|---|
| 2,577,919 | Roy | Dec. 11, 1951 |
| 2,628,473 | Frye | Feb. 17, 1953 |
| 2,677,232 | Collins | May 4, 1954 |
| 2,684,570 | Nordfors | July 27, 1954 |
| 2,716,329 | Lunger | Aug. 30, 1955 |

FOREIGN PATENTS

| | | |
|---|---|---|
| 590,177 | Great Britain | July 10, 1947 |